US012770345B2

(12) United States Patent
Segal

(10) Patent No.: US 12,770,345 B2
(45) Date of Patent: Oct. 20, 2026

(54) SYSTEMS AND METHODS FOR AUGMENTED REALITY USING HEAD-BASED WEARABLES TO INTERACT WITH OBJECTS

(71) Applicant: NAQI LOGIX INC., Vancouver (CA)

(72) Inventor: David Segal, York, PA (US)

(73) Assignee: NAQI LOGIX INC., Vancouver (CA)

( * ) Notice: Subject to any disclaimer, the term of this patent is extended or adjusted under 35 U.S.C. 154(b) by 56 days.

(21) Appl. No.: 18/849,111

(22) PCT Filed: Mar. 22, 2023

(86) PCT No.: PCT/US2023/064836
§ 371 (c)(1),
(2) Date: Sep. 20, 2024

(87) PCT Pub. No.: WO2023/183858
PCT Pub. Date: Sep. 28, 2023

(65) Prior Publication Data

US 2025/0232535 A1 Jul. 17, 2025

Related U.S. Application Data

(60) Provisional application No. 63/322,560, filed on Mar. 22, 2022.

(51) Int. Cl.
*G06T 19/00* (2011.01)
*G06F 3/01* (2006.01)

(52) U.S. Cl.
CPC ............ *G06T 19/006* (2013.01); *G06F 3/012* (2013.01); *G06F 3/013* (2013.01)

(58) Field of Classification Search
CPC ....... G06T 19/006; G06F 3/012; G06F 3/013; G06F 3/015; G06F 3/0346
See application file for complete search history.

(56) References Cited

U.S. PATENT DOCUMENTS 10,275,027 B2 4/2019 Segal
2015/0116473 A1* 4/2015 Yasuda ............... G06F 3/04842 348/78

(Continued)

FOREIGN PATENT DOCUMENTS

CN 112507799 A 3/2021
WO 2016134241 A1 8/2016
WO 2018136893 A1 7/2018

OTHER PUBLICATIONS

International Preliminary Report on Patentability issued in International Application No. PCT/US2023/064836, 16 pages, dated Sep. 24, 2024.

(Continued)

*Primary Examiner* — Maurice L. Mcdowell, Jr.
(74) *Attorney, Agent, or Firm* — DLA Piper LLP US

(57) ABSTRACT

Systems and methods are provided for interacting with a physical object. Techniques include receiving data parameters associated with a user via a head-based wearable device; receiving data parameters associated with the object via the head-based wearable device; determining that the user is in vicinity of the object; transmitting the user data parameters and object data parameters to a processor, wherein the processor is configured to: identify at least one sight-vector object definition with the object based on the object data parameters; identify at least one sight-vector object matrix with the user; determine a user-engagement state with the object; set an execution value based on the user-engagement state; and transmit the execution value to an output server.

18 Claims, 5 Drawing Sheets

(56) References Cited

U.S. PATENT DOCUMENTS

| | | | | |
|---|---|---|---|---|
| 2016/0246384 | A1* | 8/2016 | Mullins | G06F 3/017 |
| 2016/0248995 | A1 | 8/2016 | Mullins et al. | |
| 2016/0364758 | A1 | 12/2016 | Achhra et al. | |
| 2018/0205570 | A1* | 7/2018 | Kang | H04L 12/2818 |
| 2018/0210549 | A1 | 7/2018 | Segal | |
| 2019/0212818 | A1 | 7/2019 | Segal | |
| 2020/0225750 | A1 | 7/2020 | Segal | |
| 2021/0012381 | A1 | 1/2021 | Achhra et al. | |
| 2021/0089128 | A1 | 3/2021 | Segal | |
| 2022/0084070 | A1 | 3/2022 | Achhra et al. | |
| 2022/0188964 | A1* | 6/2022 | Hagland | H04N 21/226 |
| 2022/0276708 | A1 | 9/2022 | Segal | |
| 2023/0130770 | A1* | 4/2023 | Miller | G06N 20/00<br>345/156 |

OTHER PUBLICATIONS

International Search Report and Written Opinion issued in International Application No. PCT/US2023/064836, 18 pages, dated Jun. 23, 2023.

Wolpaw et al, "Brain-computer interfaces for communication and control", Clinical Neurophysiology, vol. 113, pp. 767-791, Mar. 2, 2022.

* cited by examiner

| | |
|---|---|
| SVOM ID | String Value |
| Belongs to SVO ID | String Value |
| Sight Vector ID | String Value |
| User's Heading Value Minimum from Naqi Earbud IMU or Naqi-Enabled Earbud IMU (n#) | Integer Value |
| User's Heading Value Maximum from Naqi Earbud IMU or Naqi-Enabled Earbud IMU (n#) | Integer Value |
| Roll Value Minimum from Naqi Earbud IMU or Naqi-Enabled Earbud IMU (n#) | Real Number Value |
| Roll Value Maximum from Naqi Earbud IMU or Naqi-Enabled Earbud IMU (n#) | Real Number Value |
| Pitch Value Minimum from Naqi Earbud IMU Naqi-Enabled Earbud IMU (n#) | Real Number Value |
| Pitch Value Maximum from Naqi Earbud IMU Naqi-Enabled Earbud IMU (n#) | Real Number Value |
| Yaw Value Minimum from Naqi Earbud IMU or Naqi-Enabled IMU (n#) | Real Number Value |
| Yaw Value Maximum from Naqi Earbud IMU or Naqi-Enabled IMU (n#) | Real Number Value |
| GPS Latitude Value Minimum from Naqi Earbud Charging Case, Mobile Phone or connected GPS transceiver | Real Number Value |
| GPS Latitude Value Maximum from Naqi Earbud Charging Case, Mobile Phone or connected GPS transceiver | Real Number Value |
| GPS Longitude Value Minimum from Naqi Earbud Charging Case, Mobile Phone or connected GPS transceiver | Real Number Value |
| GPS Longitude Maximum Value from Naqi Earbud Charging Case, Mobile Phone or connected GPS transceiver | Real Number Value |
| SVO Altitude Minimum | Real Number Value |
| SVO Altitude Maximum | Real Number Value |
| User-Observer Altitude Minimum | Real Number Value |
| User-Observer Altitude Maximum | Real Number Value |
| Minimum SVO Speed Derived from GPS Data | Real Number Value |
| Maximum SVO Speed Derived from GPS Data | Real Number Value |
| Minimum User Speed Derived from GPS Data | Real Number Value |
| Maximum User Speed Derived from GPS Data | Real Number Value |
| Allow Engagement Begin Timestamp (n#) | Timestamp HH:MM:SS |
| Allow Engagement End Timestamp (n#) | Timestamp HH:MM:SS |
| Minimum Gaze Timing Trigger (measured in seconds) | Real Number Value |
| Area of Effect (AoE) of SVO: Decimal Equaling Single GPS Square Unit | Real Number Value |
| User Engagement State | Boolean Data Type Value (TRUE/FALSE) |
| Execution Value | INTEGER: 0 to n |
| Sub-Command Gateway | FALSE if Execution Value >0; TRUE if Execution Value =0 |
| Optional Sub-Command (LEFT) | INTEGER: n1 |
| Optional Sub-Command (RIGHT) | INTEGER: n2 |
| Optional Sub-Command (UP) | INTEGER: n3 |
| Optional Sub-Command (DOWN) | INTEGER: n4 |
| Optional Sub-Command (ROLL LEFT) | INTEGER: n5 |
| Optional Sub-Command (ROLL RIGHT) | INTEGER: n6 |

FIG. 4

SYSTEMS AND METHODS FOR AUGMENTED REALITY USING HEAD-BASED WEARABLES TO INTERACT WITH OBJECTS

PRIORITY

This application is a 371 of International Application No, PCT/US2023/064836, filed Mar. 22, 2023, which claims priority to U.S. Provisional Application No. 63/322,560, filed Mar. 22, 2022, the entireties of which are incorporated herein by reference.

BACKGROUND

Enhancing a user's interaction with the surrounding physical world through complex synergistic analyses of the user's bio-data and real-world object data in an augmented reality setting is an area of high interest. Some markets have focused on reading brain waves to operate devices or to generate speech communication. Devices that read brain waves and control devices are commonly referred to as brain-computer interfaces (BCI), mind-machine interfaces (MMI), direct neural interfaces (DNI), synthetic telepathy interfaces (STI), or brain-machine interfaces (BMI).

A BCI is a system in which messages or commands that a user sends to the external world do not pass through the brain's normal output pathways of peripheral nerves and muscles. For example, in an electroencephalography (EEG)-based BCI, the messages are encoded in EEG activity. A BCI provides its user with an alternative method for acting on the world. Some early BCIs are described in Wolpaw, Jonathan R., N. Birbaumer, D. J. McFarland, G. Pfurtscheller, and T. M. Vaughan, "Brain-computer interfaces for communication and control," *Clinical Neurophysiology,* 113 (2002) 767-791.

A BCI measures electrophysiological signals from a user's brain and uses hardware and software to translate those signals into specific commands that simulate the actions intended by the user.

In conventional systems, devices such as EEG headsets read the brain's activity as electrical waves. These electrical waves can be classified into six categories: delta, theta, alpha, beta, gamma, and mu. Typically, these waves are read in real-time, interpreted, and then associated with a pre-defined action resulting in a "one-to-one correlation", meaning the user thinks "X" and the device either speaks "X" or executes "X".

Devices exist that can convert a user's thought to a direction (e.g., a direction along an axis) or movement (e.g., movement of a body part of a user, or movement of an external object), in that a user imagines a movement or direction, such as "left", or "ball moves up", or "hand moves down", which creates an easily identifiable wave pattern for the EEG to read, and the EEG sends this pattern to proprietary software which can then send a suitable corresponding (e.g., "left") command to something as simple as a computer cursor or mouse pointer to something physical, such as a wheelchair, car or other device, or can use the thought as a component in an output of item of information. Examples include a user thinking "left" which results in something moving left (e.g., a prosthetic appendage, a mouse pointer, etc.).

There are inherent challenges in the existing modality of one-to-one correlations regarding the association of brain wave patterns with spoken language or executed actions. Existing thought-to-speech technologies require implanting computer chips within the brains of the users via surgery. Existing thought-to-speech technologies also have difficulty accurately identifying common/frequent "patterns" within the brain waves of spoken and "non-spoken/thought/imagined" language. Often, these patterns can be the same for words that are similar: cat, rat, bat, mat, etc. Or similar phrases such as, "I hate cats" and "irate bats". Even with implanted chips, users can expect a success rate of between 45% and 89%. For more on thought-to-speech, see "Machine Translates Thoughts into Speech in Real Time", Dec. 21, 2009, "phys.org".

If an "over-the-counter" EEG machine is incorporated with the existing modalities of brain wave interpretation, the resolution of the device is typically not accurate enough to consistently identify the intended thought to be useful. Not only is the general interpretation of brain waves and specific brain wave patterns very difficult due to their dynamic nature and high variability, but outside electrical interference from commonly used devices, such as cell phones and televisions, make this process even more difficult and the output more inaccurate.

The challenges in the user's thought-to-command category of thought-controlled devices are nearly identical with the above thought-to-speech category. Problems with correctly identifying the non-verbalized command greatly affect the selection of the associated action.

There are also challenges with the user's thought-to-direction category. These one-to-one correlations of non-spoken commands/thoughts into the direction of "something" is by far the most accurate and repeatable process for all thought-controlled devices. Up, down, left and right are all consistent, repeatable patterns, and might be the most easily identifiable markers within commonly collected EEG brain wave data. However, this category is limited in that researchers and inventors are only using this logic to associate directional-based thoughts with the movement of an object (e.g., movement of a mouse pointer, movement of a computer cursor, operation of a wheelchair, driving a car, operating an exoskeleton, or the like), which remains a one-to-one correlation of "imagined direction" with the actual executed direction, whether it be virtual via software or mechanical via devices and equipment.

This challenge/limitation leaves a void in controlling devices not operated with directional thought. For example, controlling, by using thought, devices such as televisions, doors, appliances, adjustable beds or even mobile phones and tablet computers is not easily done using conventional methods. The answer would lead one to operate within the thought-to-speech or thought-to-command modalities, which are highly unreliable and unpredictable. It would not necessarily lead one to operate within the thought-to-direction modality due to the traditionally perceived limitation of a finite number of directional thoughts.

Additional difficulties arise when a user of a BCI head-based wearable device is in the vicinity of multiple real-world objects for potential interaction via augmented reality. It is often difficult for existing systems and methods to accurately identify the user intent to meaningfully engage with a specific object among a set of objects and to make an intelligent decision as to whether or not to enable user interaction with that specific object via the head-based wearable device (e.g. to deliver commands to control the object, or to receive informational content from the object). For example, a user who maintains a direct gaze at a real-world physical world object in the user's vicinity (e.g., a storefront, a billboard, or a statute of a historical figure) will likely possess the desire to engage in an interaction with that object via the head-based wearable device. By contrast, a user who merely stands in front of such an interactable object without maintaining a direct line of sight with the object (e.g. the user is reading email messages on his cellphone) may have no actual intent or desire to engage with that specific object.

There is a need for improved systems and methods for using thoughts and other input to define a single action, function, or execution for non-tactile (e.g., not requiring touch input as required with a keyboard or mouse) or thought-controlled devices that is more reliable and accurate. Furthermore, there is a need for systems and methods which would accurately identify the user intent to meaningfully engage with an object in the surrounding physical world, and allow the user to navigate and deliver complex input into information systems that interface with objects in a non-tactile manner (i.e., without speaking-to or touching).

SUMMARY

Disclosed embodiments include a method of interacting with a physical object using a head-based wearable device. The method comprising receiving data parameters associated with a user via the head-based wearable device; receiving data parameters associated with the object via head-based wearable device; and determining that the user is in vicinity of the object. The method may further comprise transmitting user data parameters and object data parameters to a processor, wherein processing unit is configured to identify at least one sight-vector object definition with the object based on the object data parameters, identify at least one sight-vector object matrix with the user, determine an user-engagement state with the object, set an execution value based on the user-engagement state, and transmit the execution value to an output server.

Disclosed embodiments also include a system for interacting with a physical object. The system may comprise a head-based wearable device, a memory for storing instructions, and at least one processor configured to execute a set of instructions to: receive data parameters associated with a user via head-based wearable device; receive data parameters associated with the object via the head-based wearable device; and determine that the user is in vicinity of the object. The processor may be further configured to identify at least one sight-vector object definition with the object based on the object data parameters, identify at least one sight-vector object matrix with the user, determining a user-engagement state with the object, setting an execution value based on the user-engagement state, and transmit the execution value to an output server.

It is to be understood that both the foregoing general description and the following detailed description are exemplary and explanatory only and are not restrictive of the disclosed embodiments, as claimed.

BRIEF DESCRIPTION OF DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings:

FIG. 4 depicts an exemplary set of sight-vector object parameters within a sight-vector object matrix as part of a system for interacting with physical objects using a head-based wearable device.

DETAILED DESCRIPTION

In following detailed description, numerous specific details are set forth in order to provide a thorough understanding of disclosed example embodiments. However, it will be understood by those skilled in the art that principles of example embodiments may be practiced without every specific detail. Well-known methods, procedures, and components have not been described in detail so as not to obscure principles of example embodiments. Unless explicitly stated, example methods and processes described herein are not constrained to a particular order or sequence or constrained to a particular system configuration. Additionally, some of described embodiments or elements thereof can occur or be performed simultaneously, at same point in time, or concurrently. Reference will now be made to disclosed embodiments, examples of which are illustrated in accompanying drawings.

As used herein, a "network" shall refer to any type of network or networks, including those capable of being utilized with a data conversion and distribution system described, such as any public and/or private networks, including, for instance, the Internet, an intranet, or an extranet, any wired or wireless networks or combinations thereof.

Systems and methods disclosed herein allow for detection of user engagement with a real-world object based on comprehensive user-object data analysis through a BCI head-based wearable device. Such systems and methods further enable unique individualized user interactions with objects (e.g., controlling or commanding the object or receiving audio feedback in a non-tactile manner) based on specifically defined layers of user access. The disclosed systems and methods enable such interactions in an augmented reality setting using a head-based wearable device, addressing a technical problem arising in user-object interaction and providing a technical solution to existing problems within this area.

Figure 1:
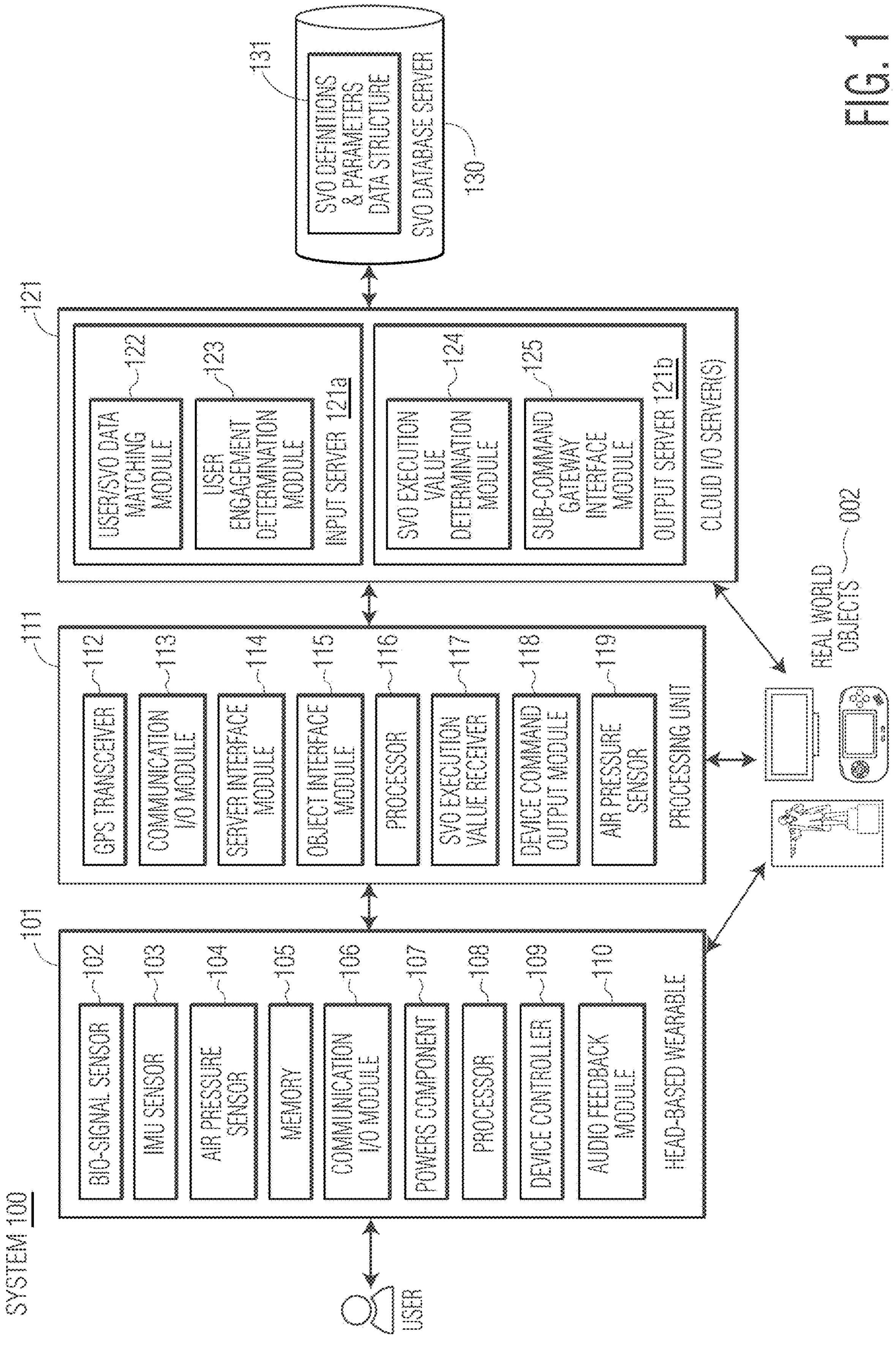
FIG. 1 depicts a schematic illustrating an exemplary system 100 for interacting with real world physical objects using a head-based wearable device.

FIG. 1 depicts a schematic illustrating an exemplary system 100 for interacting with real world physical objects using a head-based wearable device. In some embodiments, system 100 may include a head-based wearable device 101, one or more processing units 111, one or more Cloud Input/Output (I/O) server(s) 121, and at least one SVO Database Server 130.

Head-based wearable device 101 is a device configured for collecting bio-signals corresponding to a user. Head-based wearable device 101 may comprise, for example, bio-signal sensor 102, Inertial Measurement Unit (IMU) sensor 103, and air pressure sensor 104. Device 101 may further comprise memory component 105, communication module 106, and power component 107. Device 101 may further comprise processor 108, device controller 109, and an audio feedback module 110.

In some embodiments, head-based wearable device 101 may be, for example, one or more earbuds. One example of suitable earbuds is described in U.S. Pat. No. 10,275,027, "Apparatus, Methods, and Systems for Using Imagined Direction to Define Actions, Functions, or Execution." In some embodiments, device 101 may be augmented-reality eyeglasses. In some embodiments, device 101 may be configured to fit substantially within an ear canal.

As shown in FIG. 1, head-based wearable device 101 may comprise bio-signal sensor 102, which may be configured to receive one or more bio-signals from a user. As used herein, bio-signals may comprise, for example, gestural data, electromyography (EMG) data, or electroencephalogram (EEG) data. In some embodiments, bio-signal sensor 102 may comprise a gestural sensor. In some embodiments, bio-signal sensor 102 may comprise an EMG sensor. In some embodiments, bio-signal sensor 102 may comprise an EEG sensor.

As shown in FIG. 1, device 101 may comprise IMU sensor 103. An IMU is a collection of one or more sensors that capture different data types depending on the type of sensors in the IMU. An IMU, for example, may comprise one or more accelerometers, gyroscopes, and/or magnetometers. Accelerometers, for example, measure velocity and acceleration. Gyroscopes may be used to measure rotation and rotational rate. Magnetometers capture data representing cardinal direction (directional heading). In some embodiments, IMU 103 may measure a minimum of 3 degrees of freedom. IMU 103 may be configured to receive head position data from a user. In some embodiments, IMU 103 may be configured to collect angular momentum data relating to a user's head position. In some embodiments, IMU may be configured to collect force data relating to a user's head position.

As shown in FIG. 1, device 101 may comprise air pressure sensor 104. In some embodiments, sensor 104 may be configured to collect barometric air pressure data from a user. In some embodiments, sensor 104 may be configured to receive air pressure data from an integrated pressure sensor within device 101. In some embodiments, sensor 104 may be configured to receive air pressure data from an external sensor connected to device 101. In some embodiments, a processing unit (e.g. processing unit 111) may analyze data collected by air pressure sensor 104 to determine an altitude value of a user or object.

In some embodiments, device 101 may include memory component 105 provided as a non-transitory memory component configured to store software that causes process component 108, coupled to bio-signal sensor 102, to perform operations according to the software. In some embodiments, memory component 105 may aggregate one or more bio-signals to a separate, secondary device or processing unit 111. In some embodiments, memory component 105 may transmit the one or more bio-signals to a separate, secondary device such as, but not limited to, a mobile device or a computer, via a communications component.

In some embodiments, device 101 may include a communication input/output (I/O) module 106. In some embodiments, communication module 106 may transmit data from device 101 to an external device, such as a mobile phone or a computer. In some embodiments, communication module 106 may receive data from an external source, such as processing unit 111.

In some embodiments, device 101 may include power component 107. Component 107 may be configured to power one or more of bio-signal sensor 102, memory component 105, or communication I/O module 106.

In some embodiments, device 101 may include processor 108. In some embodiments, processor 108 may be configured to process bio-signal data collected by bio-signal sensor 102. In some embodiments, processor 108 may be configured to process data collected by IMU sensor 103, or air pressure sensor 104.

In some embodiments, device 100 may include device controller 109. Device controller 109 may be configured to interface with secondary devices. For example, device controller 109 may be configured to transmit a user command from device 100 to a secondary device. In some embodiments, device controller 109 may be configured to transmit digital content to a secondary device.

In some embodiments, device 100 may include audio feedback module 110. Audio feedback module 110 may be configured to output digital audio content to a user. In some embodiments, module 110 may be configured to output digital content based on a user's bio-signal collected by bio-signal sensor 102. In some embodiments, module 110 may be configured to output digital content based on received data from an external source, such as a secondary device (e.g., a mobile phone). In some embodiments, module 110 may be configured to output digital content based on received data from a processor such as processing unit 111.

As seen in FIG. 1, processing unit 111 may be configured to receive data from head-based wearable device 101. Processing unit 111 may also be configured to transmit data to an external server such as one exemplified by Cloud I/O server 121. In some embodiments, processing unit 111 may include an air pressure sensor 119. In some embodiments, processing unit 111 may collect air pressure data from a user using air pressure sensor 119. Processing unit 111 may comprise a smart phone or a computing device. Processing unit 111 may comprise a laptop computer, a tablet computer, a mobile computing unit, or a cloud-based computing unit. Processing unit 111 may comprise a charging case for wireless earbuds. Processing unit 111 may comprise a GPS transceiver 112, a communication I/O module 113, and an internal processor 116. In some embodiments, processing unit 111 may comprise a barometric sensor for air pressure sensor 119. In some embodiments, processing unit may be a cloud-based server.

GPS transceiver 112 may be configured to collect GPS positional data. In some embodiments, GPS transceiver 112 may be configured to collect GPS data from physical objects in its vicinity. In some embodiments, GPS transceiver 112 may be configured to receive GPS data from a user of head-based wearable device 101.

Communication I/O module 113 may be configured to transmit to or receive data from a head-based wearable device 101. In some embodiments, I/O module 113 may be configured to transmit or receive data from a Cloud I/O server 121. In some embodiments, I/O module 113 may be, for example, a Bluetooth or similar transceiver suitable for connecting to head-based wearable 101. In some embodiments, I/O module 113 may be a Wi-Fi or cellular data transceiver with internet connectivity. In some embodiments, I/O module 113 may be capable of receiving remote data from Cloud I/O Server(s) 121. In some embodiments, processing unit 111 may comprise one or more barometric air pressure sensors 119. In some embodiments, air pressure sensor 119 may comprise multiple barometric air pressure sensors, of which one barometric sensor may be selected as default. In some embodiments, the multiple barometric sensors may be used to calculate a real-time average.

Processor 116 may be configured to perform computational analysis based on data received from device 101. In some embodiments, processor 116 may be configured to perform computational analysis based on data received from Cloud I/O server 121.

In some embodiments, processing unit 111 may also comprise a server interface module 114, and/or an object interface module 115. In some embodiments, processing unit 111 may also comprise a sight-vector object (SVO) execution value receiver 117. In some embodiments, unit 111 may also comprise a device command output module 118.

Server interface module 114 may be configured to receive from or transmit data to a Cloud I/O server as exemplified by 121. Object interface module may be configured to transmit user commands to objects in vicinity of user wearing device 100. Object interface module 115 may also be configured to receive data from objects in the vicinity of a user wearing device 101.

Sight-vector object (SVO) execution value receiver 117 may be configured to receive an execution value from Cloud I/O server 121. In some embodiments, receiver 117 may also receive an execution command from device 101.

In some embodiments, device command output module 118 may transmit commands to external devices (e.g., a mobile phone, a television, or a smart thermostat) based on an execution value received via receiver 117.

In some embodiments, processing unit 111 may comprise of a Cloud-hosted computing unit in a Cloud environment. The Cloud environment can include a cloud-computing platform, consistent with disclosed embodiments. Examples of suitable cloud-computing platforms include, but are not limited to, MICROSOFT AZURE, AMAZON WEB SERVICES, GOOGLE CLOUD PLATFORM, IBM CLOUD, and similar systems.

As seen in FIG. 1, Cloud Input/Output (I/O) server(s) 121 may be configured to identify sight-vector object (SVO) definitions associated with physical objects in the vicinity of a user wearing device 101. Server(s) 121 may also be configured to match user data parameters with SVO definitions associated with physical objects in the vicinity of a user. Server(s) 121 may also be configured to determine an execution value based on a SVO definition matching a set of user parameters. Server(s) 121 may also be configured to access a sub-command gateway interface module 125.

Cloud I/O server(s) 121 may comprise, but is not limited to, an input server 121*a* or an output server 121*b*. In some embodiments, Cloud Input/Output (I/O) server(s) 121 may comprise of a single server serving as input server 121*a*. In some embodiments, server(s) 121 may comprise an output server 121*b*. In some embodiments, input server 121*a* may comprise of a User/SVO Data Matching Module 122 or a User Engagement Determination module 123. In some embodiments, output server 121*b* may comprise an SVO Execution Value Determination Module 124 or a Sub-Command Gateway Interface Module 125.

Sight-Vector Object (SVO) Database 130 may comprise data structures 131 for storing SVO definitions and parameters. Data structures 131 may comprise linear data structures including but not limited to one or more of tables, arrays, and linked lists. Data structures may include non-linear data structures including but not limited to graph data structures and/or tree data structures. SVO Database 130 can comprise, but is not limited to, MySQL databases or NoSQL databases such as Cassandra. In some embodiments, SVO Database 130 may reside in a local processor, exemplified by, but not limited to, processing unit 111. In some embodiments, SVO Database 130 may reside in a cloud-based server exemplified by, but not limited to, cloud I/O server 121. In some embodiments SVO Database 130 may comprise a local database. In some embodiments, SVO Database 130 may comprise a distributed database.

As would be appreciated by one of skill in the art, the particular arrangement of components depicted in FIG. 1 is not intended to be limiting. Consistent with disclosed embodiments, system 100 can include additional components, or fewer components. For example, Cloud I/O Server 121 may comprise multiple servers such as input server 121*a* and output server 121*b*). In some embodiments, processing unit 111 could reside in a head-based wearable charging case. Processing unit 111 may also reside in a secondary computing device such as a smart phone or a computing device including, but not limited to, a laptop computer, a tablet computer, a mobile computing unit, or a cloud-based computing unit.

Figure 2:
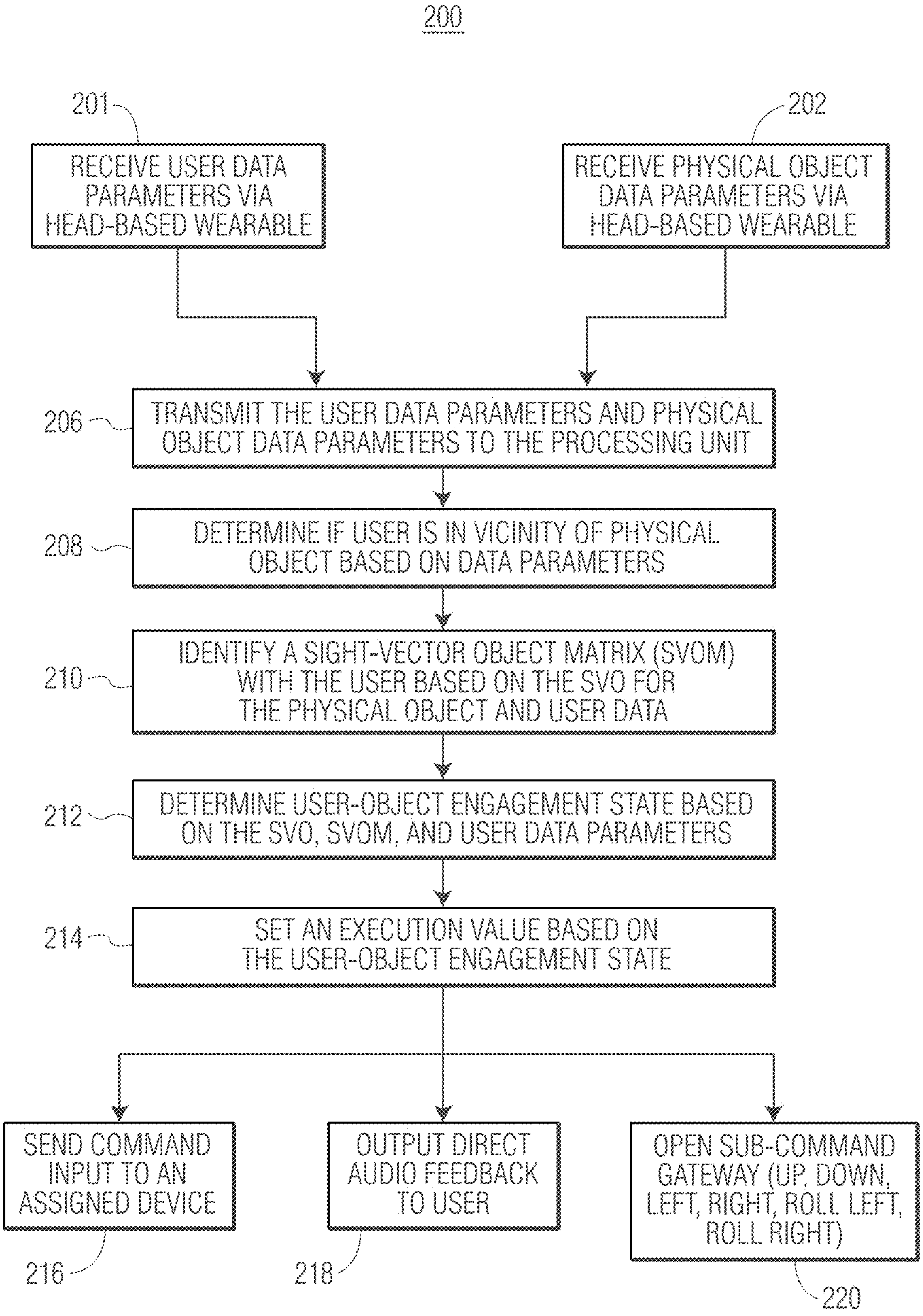
FIG. 2 depicts an exemplary method 200 for interacting with real world physical objects using a head-based wearable device based on a sight-vector object matrix.

FIG. 2 depicts an exemplary method 200 for interacting with real world physical objects using a head-based wearable device based on a sight-vector object matrix, consistent with disclosed embodiments. In step 201, user data parameters may be received via a head-based wearable device, such as head-based wearable device 101. Received user data parameters may include any data collected by the head-based wearable device. The user data parameters received in step 201 may comprise, for example, data values comprising one or more of pitch, roll, yaw values. Received user data parameters may also represent the position and movement of the user, based on the position and the movement of the head-based wearable device, such as GPS values, an altitude value, and/or a speed value. Received user data parameters may also comprise inertial measurement unit (IMU) data or gyroscopic data. User data parameters may also comprise a set of bio-signals. The set of bio-signals may further comprise air pressure data, electromyography (EMG) data, electroencephalogram (EEG) data, gestural data, and/or facial configuration data of the user.

In step 202, physical object data parameters are received via a head-based wearable device, such as head-based wearable device 101. In some embodiments, physical object data parameters may comprise of GPS coordinates associated with each object. In some embodiments, physical object data parameters may comprise a GPS longitude minimum and maximum values, and/or GPS latitude minimum and maximum values. In some embodiments, physical object data parameters may comprise altitude values, such as, but not limited to, a minimum altitude value and a maximum altitude value. In some embodiments, physical object data parameters may include speed data. Physical object data parameters may include speed data derived from GPS data. Physical object data parameters may include speed data comprising a minimum speed value and a maximum speed value.

In step 206, the user's real-time head-based wearable sensor data is transmitted to processing unit 111. Processing unit 111 may receive real-time sensor data from device 101 via data connection of any kind. In some embodiments, processing unit 111 may receive IMU data from IMU sensor 103 within device 101. In some embodiments, processing unit 111 may receive the users' real-time bio-signal data from bio-signal sensor 102 within device 100. In some embodiments, processing unit 111 may receive the users' real-time barometric air pressure data from air pressure sensor 104 within device 101. In some embodiments, processing unit 111 may also receive users' real-time processing unit's barometric air pressure data from air pressure sensor 119. In some embodiments, processing unit 111 may also receive the users' real-time GPS coordinates data from GPS transceiver 112. In some embodiments, device 101 may transmits real-time physical object parameter data to processing unit 111. Processing unit 111 may receive real-time physical object parameter data from device 101 via data connection of any kind.

Figure 5:
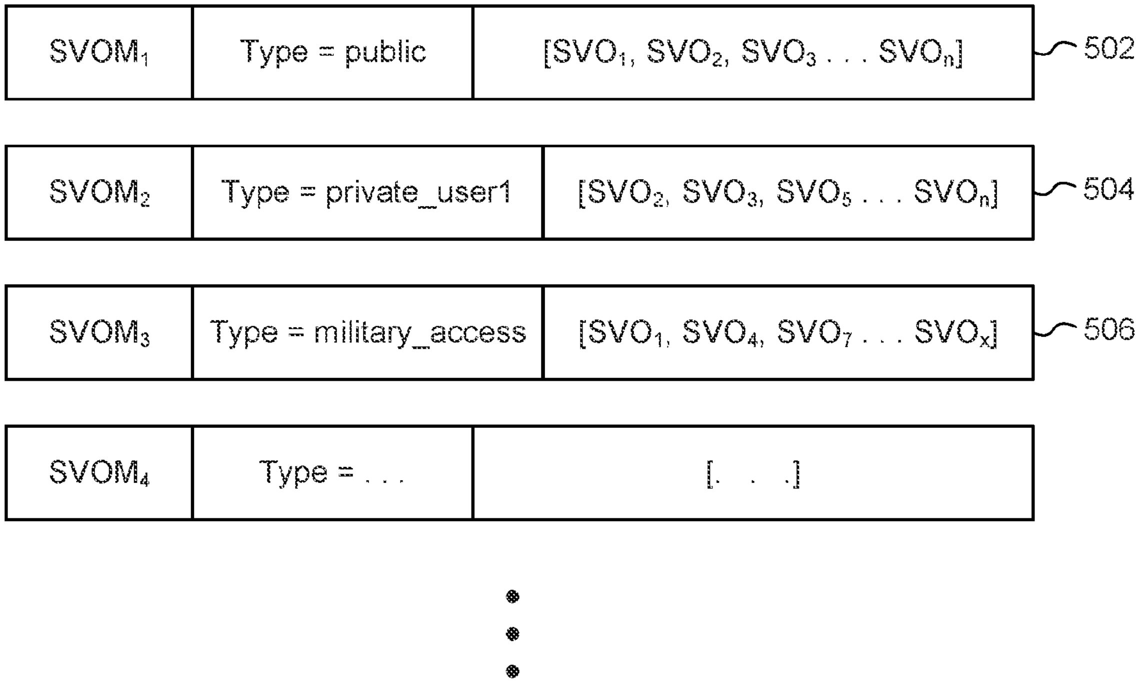
FIG. 5 depicts exemplary sight-vector object matrices containing various types of access levels and associated sets of sight-vector object definitions within each matrix.

In step 208, it is determined if the user is in the vicinity of a physical object based on sensor data from device 101 and physical object data parameters. This determination may be performed, for example, by processing unit 111. In step 210, processing unit 111 of system 100 may identify a Sight-Vector Object Matrix (SVOM) associated with the user of head-based wearable device 101. Processing unit 111 may identify an SVOM based on physical object data parameters and SVO definitions stored within data structures 131 of SVO Database Server 130. In some embodiments, processing unit 111 may receive Cloud-hosted SVO definitions. In some embodiments, device 101 may transmit user 101's real-time GPS Data of device 101 to processing unit 111 if SVO definitions are remotely hosted. Processing unit 111 may use internal processor 116 to process retrieved SVO definitions and physical object data parameters. A Sight Vector Object Matrix (SVOM) may comprise a discrete set or totality of SVO definitions each mapped to a specific real-world physical object. In some embodiments, a user would need to qualify for an SVOM by choosing to participate, or "opt-in," to services of an SVOM. In some embodiments, an SVOM may be public, private, or a hybrid between public and private, based on user preferences. In some embodiments, qualification for an SVOM may involve a monetized service. In some embodiments, qualification for an SVOM may involve level of military clearance (e.g., civilian v military combatants may comprise different levels of clearance associated with different SVOMs). For example, FIG. 5 illustrates different SVOMs associated with different types of user access, where each SVOM is associated with a distinct set of SVO definitions associated with specific physical objects. An SVO definition within an SVOM may comprise a set of data parameters associated with the physical object mapped to that specific SVO definition. Non-limiting examples of the set of data parameters are illustrated in FIG. 4.

In step 212, processing unit 111 may determine a user engagement state with a specific object based on the SVO associated with the object, the SVOM associated with the user, the user data parameters, and the object data parameters. Processing unit 111 may transmit user parameter data from device 101 data. In some embodiments, processing unit 111 may transmit physical object parameter data to Cloud Input Server 121*a*. In some embodiments, processing unit 111 may transmit SVOM data to Cloud Input Server 121*a*. In some embodiments, User/SVO Matching Module 122 may determine a set of qualifying SVO definitions based on user data parameters and physical object data parameters. In some embodiments, User/SVO Matching Module 122 may determine a set of qualifying SVO definitions based on whether user's real-time GPS coordinates. In some embodiments, user's real-time GPS coordinates may be obtained from GPS transceiver 112 within the qualifying SVO definitions' Area of Effect (AOE) parameter defined within a data structure 131 within SVO database 130. In some embodiments, User/SVO Matching Module 122 may determine a set of qualifying SVO definitions based on the matching SVO definitions within the SVOM associated with the user's level and type of access rights.

In step 212, User Engagement Determination Module 123 of Input Server 121*a* may determine an engagement state between the user and an SVO within the SVOM associated with the user. In some embodiments, User Engagement Determination Module 123 may allow or deny a user from interacting with an SVO based on whether the user has access to the SVOM to which the SVO is assigned. For instance, if a user is not subscribed to an SVOM and/or is denied access to an SVOM, User Engagement Determination Module 123 may not consider the SVO qualified and may not process SVO-User Data Parameter engagement. In some embodiments, User Engagement Determination Module 123 may determine an engagement state based on a set of allowable user-engagement data associated with each SVO definition. In some embodiments, a set of allowable user-engagement data comprises a set of durational timestamps, a minimal user-gaze trigger value, and an area-of-effect triggering value, associated with SVO definition. In some embodiments, User Engagement Determination Module 123 may dynamically enable an SVO within user's SVOM. In some embodiments, module 123 may enable an SVO by determining if user's real-time GPS coordinates are within a SVO's pre-defined Area of Effect (AOE) parameter. In some embodiments, Module 123 may dynamically disable a SVO within user's SVOM. In some embodiments, Module 123 may disable an SVO by determining if user's real-time GPS coordinates are within a SVO's pre-defined Area of Effect (AOE) parameter. In some embodiments, Module 123 may determine a positive engagement state. In some embodiments, Module 123 may determine engagement based on when an SVO's latitude minimum and latitude maximum are equivalent and the SVO's longitude minimum and longitude maximum are equivalent. In some embodiments, Module 123 may further determine engagement when both an SVO's latitude and longitude data are equal to latitude and longitude of a user. In some embodiments, Module 123 may determine engagement based on a speed of an SVO and user equal zero. In some embodiments, Module 123 may determine a positive engagement state when an SVO's latitude minimum and latitude maximum are not equivalent and/or an SVO's longitude minimum and longitude maximum are not equivalent (i.e., an SVO is greater than 1 GPS cubic unit,) and the speed of the SVO equals zero. In some embodiments, Module 123 may determine a positive engagement state when an SVO's latitude minimum and latitude maximum are equivalent and the SVO's minimum and longitude maximum are equivalent and both are equal to a user's latitude and longitude and both continue to match that of the user even though the user is moving. In some embodiments, Module 123 may determine a positive engagement state when an SVO's latitude minimum and latitude maximum values are dynamic and SVO's longitude minimum and longitude maximum are dynamic while user's latitude and longitude are not equal to that of the SVO's regardless of whether the user is moving or static.

After step 212, method 200 can proceed to step 214. In step 214, SVO Execution Value Determination Module 124 of Output Server 121*b* may determine, for the user, an SVO execution value for each qualifying SVO definition mapped to a real-world physical object, based on the qualified user-object engagement state. The SVO execution value may comprise a numerical integer value, a binary value, or a Boolean value. In some embodiments, if there exists a positive user engagement state between the user and a specific SVO, then an execution value is set to an integer greater than 0. In some embodiments, the execution value may correspond to an option which would enable a user to automatically navigate the user to a Z-axis value defined 3D Line Pattern. For instance, an example of this pattern is disclosed in U.S. Pat. No. 9,405,366.

After step 214, method 200 may proceed to step 216. In step 216, Output Server 121*b* may transmit the execution value based on the user engagement state, and the associated user data and SVO data, to the processing unit 111. In some embodiments, SVO Execution Value Receiver module 117 of processing unit 111 may receive data. In some embodiments, Device Command Output Module 118 may process received data to output a command to a secondary device predefined by SVO definition. In some embodiments, the secondary device could comprise, but is not limited to, an IoT device such as a mobile phone, a personal computer, a computer tablet, a television, or a "smart" thermostat control.

After step 214, method 200 may also proceed to step 218. In step 218, Output Server 121*b* may transmit the execution value based on the user engagement state, and the associated user data and SVO data, to processing unit 111. SVO Execution Value Receiver module 117 of processing unit 111 may receive the data, and Device Command Output Module 118 may process the received data to generate audio feedback data. Output module 118 may transmit audio feedback data to Audio Feedback Module 110 of device 101. In some embodiments, the audio feedback data may comprise a pre-recorded audio narrative providing information relating to a user-engaged object. For instance, if the user-engaged object is a statue of Martin Luther King Jr, associated audio feedback data may comprise a pre-recorded audio recording narrating pertinent historical information associated with the statute. In some embodiments, the audio feedback data may be freely accessible. In some embodiments, the audio feedback data may be sponsored by a third party, or it might be sponsored by an SVO object, should the SVO be a business entity.

After step 214, method 200 may also proceed to step 220. In step 220, Sub-Command Gateway Interface module 125 of Output server 121*b* enables a sub-command gateway. In some embodiments, sub-commands may be in the form of up, down, left, right, roll left or roll right with each direction corresponding to one or multiple pre-defined execution values.

Figure 3:
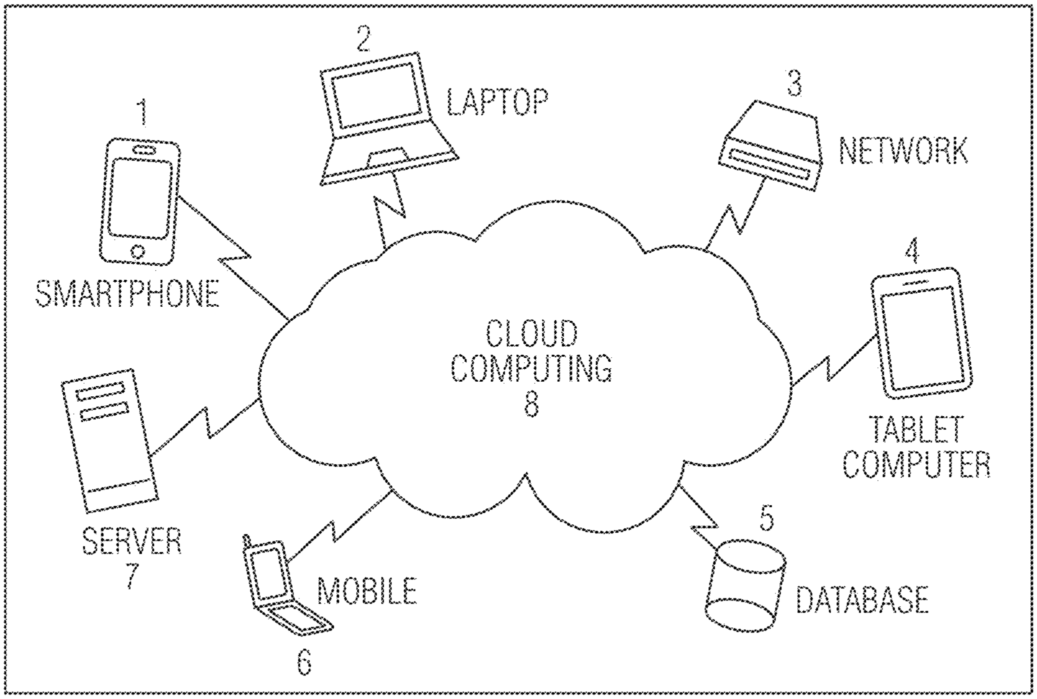
FIG. 3 depicts exemplary devices as part of a system for interacting with physical objects using a head-based wearable device.

FIG. 3 depicts exemplary devices as part of a system for interacting with physical objects using a head-based wearable device, consistent with disclosed embodiments. As would be appreciated by one of skill in art, the particular arrangement of components depicted in FIG. 1 is not intended to be limiting. For instance, consistent with disclosed embodiments, system 100 can include additional components, or fewer components. For example, processing unit 111 may comprise of multiple devices such as a mobile phone 1, a laptop computer 2, a tablet computer 4, or a Cloud-based computing unit 8.

FIG. 4 depicts an exemplary set of sight-vector object (SVO) parameters within a sight-vector object matrix (SVOM) as part of a system for interacting with physical objects using a head-based wearable device, consistent with disclosed embodiments. The non-exhaustive list of parameters in FIG. 4 may be part of a SVO definition within an SVOM wherein each SVO definition is mapped to a corresponding physical object. In some embodiments, an SVO definition corresponding to a real-world physical object (e.g., a TV, a game console, or a thermostat) may contain an SVOM ID, which contains an identifying value of a specific SVOM which contains an SVO, and a Sight-Vector ID, which contains an identifying value of the SVO. In some embodiments, an SVO definition may contain paired minimum-maximum values for each of a user's heading, roll, pitch, and yaw (RPY) values collected from bio-signal sensor 102, IMU 103, and/or Air Pressure sensor 104 of device 101, which may collectively form data describing the user's head position and spatial orientation. In some embodiments, an SVO definition may contain paired minimum-maximum values for GPS longitude and latitude values collected by head-based wearable device 101, which may collectively form data describing a user's GPS location. In some embodiments, an SVO definition may contain paired minimum-maximum values for altitude or speed of both user and SVO, which may be used collectively by processing unit 111 to determine the user engagement state with the SVO. In some embodiments, an SVO definition may contain beginning and end time-stamps for allowing engagement, which may collectively define a time duration during which a user is permitted to engage with an SVO via processing unit 111. In some embodiments, an SVO definition may contain a minimum gaze triggering time which may allow bio-signal sensor 102 of device 101 to measure number of seconds necessary for a user to maintain a direct gaze with a specific object to qualify for a positive engagement state, and to transmit the user engagement state to processing unit 111 to elicit additional commands. In some embodiments, an SVO definition may contain an area-of-effect (AOE) value which user engagement determination module 123 of a Cloud-based server 121 may utilize to determine boundaries for an area where user engagement with the SVO is positive. In some embodiments, an SVO definition may contain an execution value fora sub-command gateway, which enables a user to control an object using the sub-command gateway. In some embodiment, a sub-command gateway may comprise six sub-commands (e.g., up, down, left, right, roll left, roll right).

FIG. 5 depicts exemplary sight-vector object matrices containing various types of access levels and associated sets of sight-vector object definitions within each matrix, consistent with disclosed embodiments. For instance, $SVOM_1$ 502 depicts a publicly-accessible SVOM containing a specific set of SVO definitions ranging from $SVO_1$ to $SVO_n$. $SVOM_2$ 504 depicts a private SVOM associated with user1, which comprises a distinct set of SVO definitions based on user access rights; and $SVOM_3$ 506 depicts a military-access only SVOM which may contain a restricted set of SVO Definitions not accessible by non-military personnel.

The disclosed embodiments may be implemented in a system, a method, and/or a computer program product. computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of computer-readable storage media includes: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to the respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, to perform aspects of the present invention.

Aspects of the present inventions are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. se computer-readable program instructions may also be stored in a computer-readable storage medium that can direct a computer, a programmable data processing apparatus, and/or other devices to function in a particular manner, such that the computer-readable storage medium having instructions stored rein comprises an article of manufacture including instructions which implement aspects of the function/act specified in the flowchart and/or block diagram block or blocks.

Computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed.

It is expected that during the life of a patent maturing from this application many relevant virtualization platforms, virtualization platform environments, trusted cloud platform resources, cloud-based assets, protocols, communication networks, security tokens and authentication credentials will be developed, and the scope of these terms is intended to include all such new technologies a priori.

It is appreciated that certain features of the inventions, which are, for clarity, described in the context of separate embodiments, may also be provided in combination in a single embodiment. Conversely, various features of the inventions, which are, for brevity, described in the context of a single embodiment, may also be provided separately or in any suitable subcombination or as suitable in any other described embodiment of the inventions. Certain features described in the context of various embodiments are not to be considered essential features of those embodiments, unless the embodiment is inoperative without those elements.

Although the inventions have been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed:

1. A method of interaction with a physical object, comprising:
- receiving data parameters associated with a user via a head-based wearable device;
- receiving data parameters associated with the object via the head-based wearable device;
- determining that the user is in vicinity of the object; and
- transmitting the user data parameters and object data parameters to a processor, wherein the processor is configured to:
  - identify at least one sight-vector object definition corresponding with the object based on the object data parameters;
  - identify at least one sight-vector object matrix associated with the user;
  - determine a user-engagement state with the object;
  - set an execution value based on the user-engagement state; and
  - transmit the execution value to an output server configured to enable a sub-command gateway for the user.

2. The method of claim 1, wherein the user data parameters comprise one or more of a set of pitch, roll, yaw values, a set of GPS values, an altitude value, a speed value, inertial measurement unit (IMU) data, and a set of bio-signals.

3. The method of claim 2, wherein the set of bio-signals further comprises air pressure data, electromyography data, or facial configuration data of the user.

4. The method of claim 1, wherein the sight-vector object definition comprises an object ID, a set of positional data, and a set of allowable user-engagement data.

5. The method of claim 4, wherein the set of positional data for the sight-vector definition comprises longitude and latitude GPS data and speed data derived from GPS data.

6. The method of claim 4, wherein the set of allowable user-engagement data comprises a set of
- durational time-stamps, a minimal user-gaze trigger value, and an area-of-effect triggering value, associated with the sight-vector object definition.

7. The method of claim 1, wherein the sight-vector object matrix comprises at least the sight-vector object definition identified with the object.

8. The method of claim 1, wherein the user engagement state is determined based on the user data parameters, the sight-vector object definition identified with the object, and the sight-vector object matrix identified with the user.

9. The system of claim 1, whereby the processor unit is further configured to send a command input to a device assigned by the sight-vector object definition, or output digital content to the user via head-based wearable device.

10. A system for interacting with a physical object, comprising:
- a head-based wearable device,
- a memory for storing instructions, and
- a first processor configured to execute the instructions to:
  - receive data parameters associated with a user via a head-based wearable device;
  - receive data parameters associated with the object via the head-based wearable device;
  - determine that the user is in vicinity of the object;
  - transmit the user data parameters and object data parameters to a second processor, wherein the second processor is configured to:
    - identify at least one sight-vector object definition corresponding with the object based on the object data parameters;
    - identify at least one sight-vector object matrix associated with the user;
    - determine a user-engagement state with the object;
    - set an execution value based on the user-engagement state; and
    - transmit the execution value to an output server configured to enable a sub-command gateway for the user.

11. The system of claim 10, wherein the user data parameters comprise one or more of a set of pitch, roll, yaw values, a set of GPS values, an altitude value, a speed value, inertial measurement unit (IMU) data, and a set of bio-signals.

12. The system of claim 11, wherein the set of bio-signals further comprises air pressure data, electromyography data, or facial configuration data of the user.

13. The system of claim 10, wherein the sight-vector object definition comprises an object ID, a set of positional data, and a set of allowable user-engagement data.

14. The system of claim 13, wherein the set of positional data for the sight-vector definition comprises longitude and latitude GPS data and speed data derived from GPS data.

15. The system of claim 13, wherein the set of allowable user-engagement data comprises a set of durational time-stamps, a minimal user-gaze trigger value, and an area-of-effect triggering value, associated with the sight-vector object definition.

16. The system of claim 10, wherein the sight-vector object matrix comprises at least the sight-vector object definition identified with the object.

17. The system of claim 10, wherein the user engagement state is determined based on the user data parameters, the sight-vector object definition identified with the object, and the sight-vector object matrix identified with the user.

18. The system of claim 10, whereby the second processor is further configured to send a command input to a device assigned by the sight-vector object definition, or output digital content to the user via head-based wearable device.

* * * * *